Figure 1:
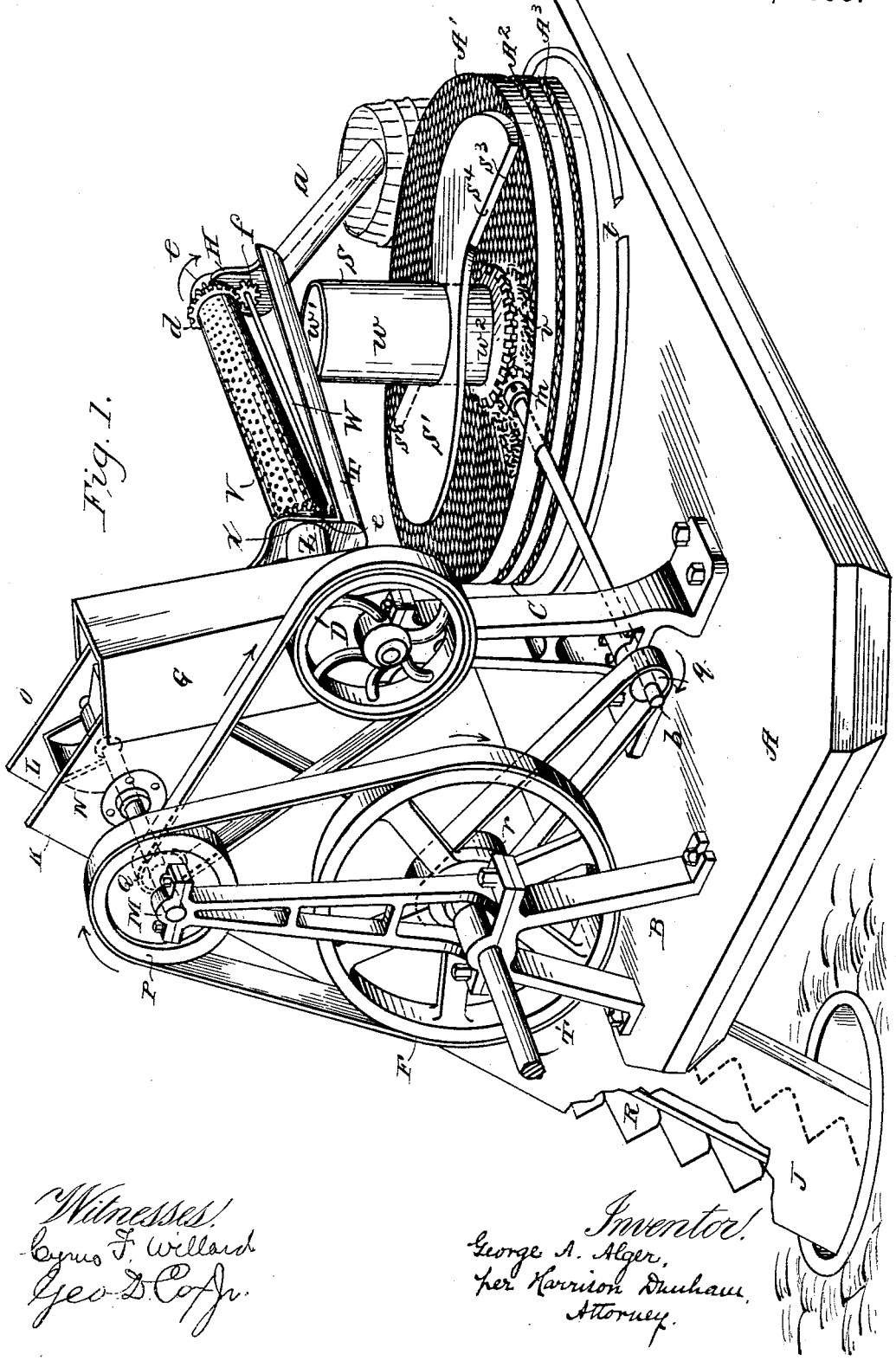

(No Model.) 2 Sheets—Sheet 1.
G. A. ALGER.
DEVICE FOR REMOVING, SEPARATING, AND FILTERING SEWAGE.
No. 550,738. Patented Dec. 3, 1895.

Witnesses:
Cyrus F. Willard
Geo. D. Coy Jr.

Inventor:
George A. Alger,
per Harrison Dunham,
Attorney.

(No Model.) 2 Sheets—Sheet 2.
G. A. ALGER.
DEVICE FOR REMOVING, SEPARATING, AND FILTERING SEWAGE.
No. 550,738. Patented Dec. 3, 1895.
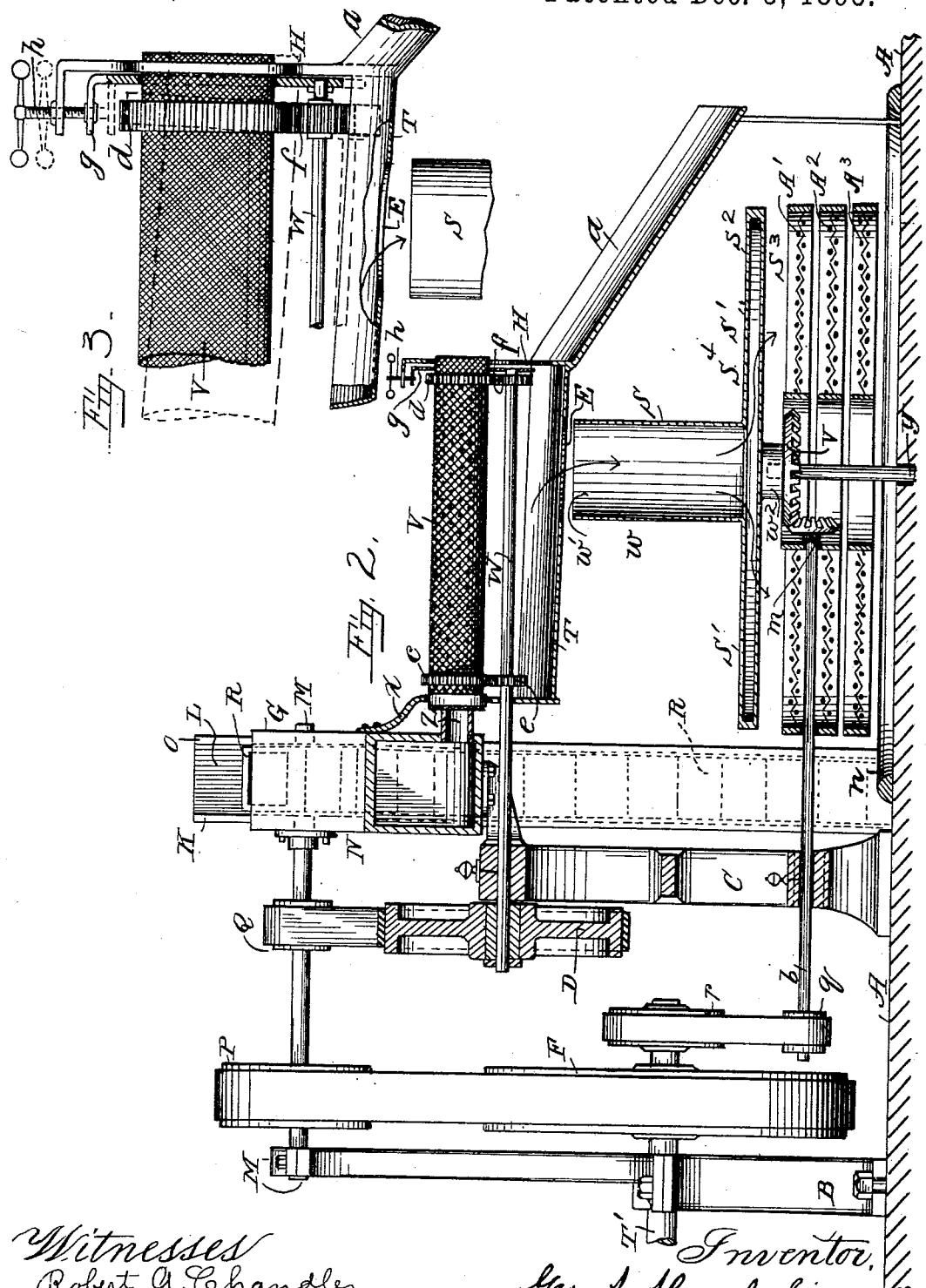
Witnesses
Robert A. Chandler
Cyrus F. Willard
Inventor
Geo. A. Alger by his
atty in fact
F. Dunham

United States Patent Office.

GEORGE A. ALGER, OF FITCHBURG, MASSACHUSETTS, ASSIGNOR OF ONE-HALF TO CHARLES A. ELLIOTT, OF SAME PLACE.

DEVICE FOR REMOVING, SEPARATING, AND FILTERING SEWAGE.

SPECIFICATION forming part of Letters Patent No. 550,738, dated December 3, 1895.

Application filed December 14, 1894. Serial No. 531,806. (No model.)

*To all whom it may concern:*

Be it known that I, GEORGE A. ALGER, a citizen of the United States, and a resident of Fitchburg, in the county of Worcester and State of Massachusetts, have invented a new and useful Improvement in Devices for Removing, Separating, and Filtering Sewage, of which the following, taken in connection with the accompanying drawings, is a specification.

My invention relates to an improvement in a device for removing, separating, and filtering sewage in which an endless chain of buckets operates in conjunction with a rotary sieve and distributer.

The objects of my improvement are to provide a means for the continuous removal and filtration of sewage at any desired location and also to separate the solid and liquid matter, so that each may be easily dealt with, as desired, and also to arrange the apparatus so that it may be readily moved from place to place whenever desired. I attain these objects by means of the mechanism illustrated in the accompanying drawings, in which—

Figure 1 represents a perspective view of the entire machine. Fig. 2 represents a side view in part section, and Fig. 3 represents a detailed view of the same.

Similar letters refer to similar parts throughout the views.

A is a table on which the entire framework of the machine is supported. This table may be adapted to rest on wheels or arranged in any suitable manner to be moved from place to place.

B and C are standards fixed in the table A, as shown.

T' is a shaft having pulleys F and $r$ thereon, said shaft being journaled in the standard B and actuated by any suitable power.

M is a shaft journaled in the standard B and the sides N and O of the chute K, hereinafter described, having the pulleys P and Q, said pulley P being revolved by a belt which connects it with pulley F.

K is a chute, of metal or any suitable material, having its lower end J below the table A and fixed to the said table by any desired methods where it comes in contact with said table, the upper end L of said chute K being adapted to rest in the box G.

G is a box, of suitable material and form, resting on the standard C.

R is an endless chain of buckets, which may be hooked together or fixed on an endless chain or belt, which in either form rests on the shaft M at its upper end and at its lower end arranged on any suitable shaft journaled in the sides N and O at the lower part of chute K.

Z is a metal spout fixed in the lower part of box G, which has an opening adapted to receive it.

$x$ is a holder fixed to the side of the box G.

T is a trough, of suitable material, fixed to the holder $x$ and sianting downward at its outer end and having the orifice E.

$a$ is a conductor on end of trough T, of shape as shown.

H is a frame fixed on the outer end of the trough T, in the upper arm of which is a threaded bore to receive the adjusting-screw $h$.

$g$ is the inner adjustable frame supporting and fitting around the end of the rotary sieve V, hereinafter described, in the upper arm of which adjustable frame is fixed the adjusting-screw $h$.

V is a rotary sieve, of woven-wire mesh, with the cog $c$ at one end and the cog $d$ at the other end gearing into cogs $e$ and $f$ on the shaft W. The inner end of said rotary sieve V is adapted to rotate in the holder $x$ and receive the spout Z, while the outer end rotates in the adjustable frame $g$.

S is a distributer composed of the tube $w$ and the chambered flanges S'. The tube $w$ of the distributer has the upper end $w'$ directly under the orifice E of the trough T, the lower end of said tube being joined to the upper plate $S^2$ of the flange S', which has an opening adapted to the end of the tube, as shown in Fig. 2.

$S^3$ is the lower plate of the flange S'. Between the plates $S^2$ and $S^3$ of the flange S' are the openings $S^4$ on the opposite sides of the right and left wings of the flange S', as shown in Fig. 1. Below the lower plate $S^3$ is the block $w^2$, on which said plate $S^3$ is fixed, and which is fitted on the shaft $y$, the lower end of which is journaled in the table A.

$v$ is a cog-wheel on the shaft $y$ under the block $w^2$, the teeth of which mesh with the cog-wheel $m$ on the shaft $b$. The shaft $b$ is journaled in the standard C and has thereon the pulley $q$, which is driven by a belt from the pulley $r$.

$A'$ $A^2$ $A^3$ are sieves, preferably of circular form and arranged one above the other, having therein gravel or such other filtrating material as may be desired and having an opening in the center surrounded by a rim, so as to allow the working of the cog-wheels $v$ and $m$.

$n$ is a circular shoulder adapted around the sieves on the table A and having the opening $t$, as shown in Fig. 1.

D is a pulley on the shaft W and driven by a belt from the pulley Q on the shaft M.

The machine being arranged at any desired location, the end of the chute is placed in a cesspool or sewer-opening, as represented in Fig. 1, the shaft T' is operated by connection with any desired power, and the said power is transmitted by pulley P by the belting, as shown, passing in the direction indicated in Fig. 1. Thus the shaft M is rotated, and the buckets are continuously raised and lowered on their endless chain within the chute K. The buckets, preferably of the form R, as shown, obviously, when they reach the sewage matter, act as scoops to raise the sewage and also to bring down with them the purifying exterior air, serving as blowers to the sewer or cesspool by the continual driving of the air into the openings by the scoops. The buckets, after scooping up the sewage matter, rise on their endless chain, and when they reach the box G are turned and thereby throw their contents into the box G. The sewage matter is then forced by its own weight and the incline of box G, as shown in Fig. 1, through the spout Z into the rotary sieve V. The sieve is rotated in the adjustable frame $g$ and holder $x$ by the cog-wheels $c$ and $d$, gearing with the cogs $e$ and $f$ on the shaft W, said shaft W being turned by the pulley D, which is moved by the belt connecting from the pulley Q on the shaft M, as indicated in Fig. 1. This rotary motion forces the fluid matter through the holes of the sieve into the trough below, where it drops through the opening E into the open end $w'$ of the distributer S, which is being revolved by the cog-wheels $v$ and $m$, gearing with each other and operated by the power from the belt on the pulleys $q$ and $r$. The fluid matter is dispersed when it strikes the bottom of the distributer through the flanges $S'$ of the distributer, and thence through the outlet-openings $S^4$, and as the distributer is revolved by the cog-wheels $v$ and $m$ the fluid matter or water holding sewage in solution is evenly distributed over the filtering-surfaces of the sieves in such a manner as to prevent its being thrown too much on any one point of the surface of the sieves. On the sieves is placed gravel, charcoal, or any other suitable filtering substance, thus making a filtrating-bed which is protected by circular partitions, which rise above the surface of the filtering-bed and serve to retain the gravel, charcoal, or other filtering substance placed on the surface of the sieves and likewise to retain such solid matter as may be held in suspension when deposited on the filtering substance by the water as it passes through the different filtering-beds. When the fluid has been filtered as desired, it can be run off at the opening $t$. The solid matter is forced along the rotary sieve by the force of gravity through its outer end, which is slightly lower than the inner end, and from there falls along the conductor $a$ into a barrel or other suitable receptacle.

Having thus described my invention, what I claim, and desire to secure by Letters Patent, is—

1. In a device for removing, separating and filtering sewage, in combination, a chain of buckets arranged with a box and spout and rotary sieve of woven wire mesh, as described, said spout being fixed on the lower part of said box as shown and received by the inner end of said rotary sieve, being arranged as described, so that the sewage carried by said buckets to said box may pass from said box by said spout into said sieve as described, an inclined trough having a circular opening at the bottom thereof halfway between the ends as shown, a distributer having a tube provided with an opening arranged under the circular opening of said trough, said distributer being arranged as shown and provided with means of being operated as described; all substantially as described and for the purpose set forth.

2. In a device for removing, separating and filtering sewage, in combination the distributer provided with a tube open at its upper end and adapted to receive the fluid holding sewage and also provided with flanges to the upper plate of which the lower end of said tube is joined as described, the opening in said upper plate coinciding with the diameter of the tube and the space between the upper and lower plates of said flanges forming a chamber, the outer edges of which are closed between said plates except as provided with lateral openings on opposite sides of the right and left wings to allow the egress of the sewage as the distributer is revolved, together with suitable means of revolving said distributer, and filtering beds and sieves beneath said chambered flanges, over the surface of which said sewage is distributed; all arranged and actuated as shown and for the purpose set forth.

In testimony whereof I have signed my name to this specification, in the presence of two subscribing witnesses, on this 27th day of October, A. D. 1894.

GEORGE A. ALGER.

Witnesses:
H. DUNHAM,
CYRUS F. WILLARD.